July 12, 1960  J. A. ZIEGLER  2,944,909
METHOD OF SMOKING SAUSAGE MEAT
Filed Sept. 3, 1957
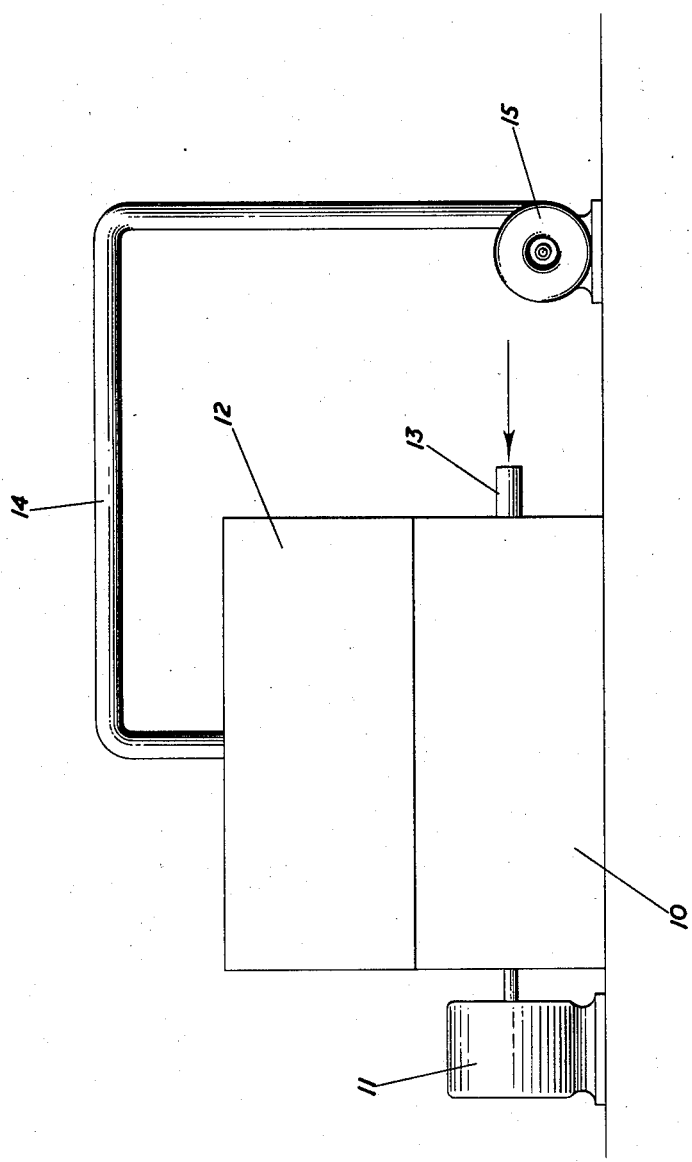
Inventor
JOHN A. ZIEGLER
By Featherstonhaugh & Co.
Attys.

2,944,909
METHOD OF SMOKING SAUSAGE MEAT

John A. Ziegler, Toronto, Ontario, Canada, assignor to The Griffith Laboratories, Inc., Chicago, Ill.

Filed Sept. 3, 1957, Ser. No. 681,533

3 Claims. (Cl. 99—229)

This invention relates to improvements in the smoking of meat for sausages and the like.

In the smoking of sausages the usual process that has been followed up to the present time is to introduce the formed sausages into the smoke house and to cook the sausages while smoking them for a period of three to four hours. However, while this process has been very successful with the use of natural sausage casings, it does not produce the same result with the present-day sausage casings made from cellulose or other artificial media, as the full desired result is not obtained with these latter casings because they are not as permeable to smoke as the previously used animal casings. Moreover it has been found in effect that penetration of the smoke is limited from one-eighth to approximately a quarter of an inch in depth of the sausage according to present smoking processes.

Notwithstanding the degree of success of sausage smoking processes as above set out when using animal casings or the difficulties of achieving a properly smoked product when using cellulose casings or other artificial media, a substantially long smoking period is necessary. I have avoided these difficulties by providing a method of smoking meat for sausages and the like wherein desired smoke flavour may be achieved in the course of one minute or over a short period up to desired smoke permeation, depending on the degree of smoking desired, and taking into consideration also density of the smoke.

Sausage meat is normally subjected to comminution in a suitable comminuting machine, such as a meat chopping device or silent cutter, in the course of which the necessary seasonings, binder, ice and/or water are added. In some processes the seasonings are added at different times during the comminuting period. According to the present invention I follow a new method of smoking by subjecting the said mixture to a smoke treatment during the comminuting operation, so that in result when smoke is introduced for a minute or a few minutes, depending upon the density of the smoke, and permeation desired, the sausage material will be given a complete smoking prior to introduction thereof to the casings, so that when they are cooked, such as by introducing them to the smoke house for cooking purposes, but without the introduction of the smoke in the normal manner, the resulting product is a smoked sausage of very high quality.

The invention therefore generally comprises subjecting the raw comminuted sausage material to a short period of smoking prior to introduction of such material to the sausage casing for cooking purposes, whereby to produce a thoroughly smoked edible meat product with a very limited period of smoking.

The invention will be clearly understood by reference to the accompanying drawings, which illustrate diagrammatically a meat comminuting device associated with a smoke housing capable of supplying a concentration of smoke during the comminuting operation.

Referring to the drawings, 10 indicates a meat comminuting machine of any desired character capable of comminuting the meat and to which may be added in any general manner a suitable binder, together with seasonings at any time during the comminuting operation. The comminuting device may include a motor 11 or other suitable means for operating the meat comminuting or chopping means, and the apparatus 10 is provided with a suitable smoke hood or the like 12, to which may be attached the smoke conduit 13 through which smoke is introduced to the comminuted meat substantially at the upper level thereof. The smoke can be withdrawn through the conduit 14 by means of a suitable suction device 15. The smoke may be generated by any well known smoking device available on the market, and it is preferred to employ a filter in conjunction with the smoke feed to avoid particles of burnt sawdust, tar and the like which may arise from the smoke producing means.

The smoking operation can be carried out from one minute or over a further short period up to the desired permeation, depending on the degree of smoking desired and density of the smoke employed. Usually it will be found that the desired results are obtained in a period of one to three minutes.

In some cases, seasonings are added to the product being comminuted at different times during the comminuting operation. In this case, therefore, the smoking will be carried out over the last one to three minutes of the comminuting operation, or a time period coinciding with the latter stages of the comminuting operation.

By processing sausage meat in this way smoking can be accomplished in a fraction of the time to that in past processes, and the permeation achieved is of a more practical degree. In addition since smoke is well known as a preservative, the more complete permeation achieved by the present method results in a product having greater preservative characteristics. Also of importance is the fact that economies result in the use of less smoke than is normally required in prior processes. Following the smoking as described, the product can be introduced into sausage casings and placed in the smoke house for cooking purposes but without the introduction of smoke at this stage, and the resulting product is a smoke sausage of very high quality having efficient preservative characteristics.

What I claim as my invention is:

1. The method of producing a smoked comminuted meat product which comprises comminuting raw meat in a comminuting container therefor and exposing the meat to an atmosphere containing smoke simultaneously during the latter portion of the comminuting operation, whereby to inter-mix said smoke with said meat as comminution proceeds.

2. The method of producing a smoked comminuted meat product which comprises subjecting raw meat to comminuting action in a comminuting container therefor, and exposing the meat to an atmosphere containing smoke and intimately inter-mixing said smoke with said meat simultaneously during the latter portion of the comminuting operation.

3. The method of producing a smoked comminuted meat product which comprises subjecting raw meat to comminuting action in a comminuting container therefor, and simultaneously exposing the meat to an atmosphere containing smoke and intimately inter-mixing said smoke with said meat during a period of one to three minutes.

References Cited in the file of this patent

UNITED STATES PATENTS

| | | |
|---|---|---|
| 1,825,528 | Knudsen | Sept. 29, 1931 |
| 1,890,215 | De Cressey | Dec. 6, 1932 |
| 2,507,486 | Weissenbach | May 9, 1950 |

FOREIGN PATENTS

| | | |
|---|---|---|
| 476,469 | Great Britain | Dec. 9, 1937 |